(12) United States Patent
Crudgington

(10) Patent No.: US 6,772,482 B2
(45) Date of Patent: Aug. 10, 2004

(54) BRUSH SEAL ELEMENT

(75) Inventor: Peter Francis Crudgington, Nr Bath (GB)

(73) Assignee: Cross Manufacturing Co. (1938) Ltd., Wiltshire (GB)

( * ) Notice: Subject to any disclaimer, the term of this patent is extended or adjusted under 35 U.S.C. 154(b) by 51 days.

(21) Appl. No.: 10/293,354

(22) Filed: Nov. 14, 2002

(65) Prior Publication Data

US 2003/0094764 A1 May 22, 2003

(30) Foreign Application Priority Data

Nov. 17, 2001 (GB) .............................................. 0127643

(51) Int. Cl.$^7$ ................................................ C05D 1/04
(52) U.S. Cl. ...................................... 16/355; 415/173.3
(58) Field of Search ....................... 277/355; 415/173.3, 415/173.5

(56) References Cited

U.S. PATENT DOCUMENTS

| | | | |
|---|---|---|---|
| 5,941,685 A | * | 8/1999 | Bagepalli et al. ........... 277/355 |
| 5,975,535 A | | 11/1999 | Gail et al. |
| 6,173,962 B1 | * | 1/2001 | Morrison et al. ........... 277/355 |
| 6,293,553 B1 | * | 9/2001 | Werner et al. .............. 277/355 |
| 6,352,263 B1 | * | 3/2002 | Gail et al. .................. 277/355 |
| 6,502,825 B2 | * | 1/2003 | Aksit et al. ................. 277/355 |
| 6,648,334 B2 | * | 11/2003 | Inoue ......................... 277/355 |

FOREIGN PATENT DOCUMENTS

| | | | |
|---|---|---|---|
| EP | 1 006 301 | * | 6/2000 |
| EP | 1 006 301 A1 | | 6/2000 |
| EP | 1 070 887 A2 | | 1/2001 |
| EP | 1 0701 887 | * | 1/2001 |
| EP | 1 245 875 | * | 10/2002 |

* cited by examiner

*Primary Examiner*—Gary S. Hartmann
(74) *Attorney, Agent, or Firm*—Young & Thompson

(57) ABSTRACT

A Brush Seal element 10 has a backing plate 11 designed to project into a gap 12 between a fixed sleeve 13 and a shaft 14 and a bristle array 15 comprising a pack of bristle layers which is held in the sleeve 13 by support 16. The bristle 15 and non-linear portion 17, 18, which define cavities 19 and 20 between the array 15 and the plate 10. These cavities can become filled with high pressure fluid so that there is a substantial pressure balance across the array 15.

18 Claims, 3 Drawing Sheets

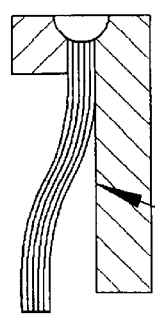
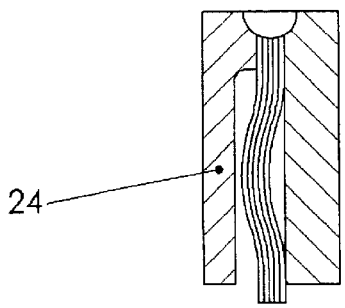
FIG 7                FIG 8
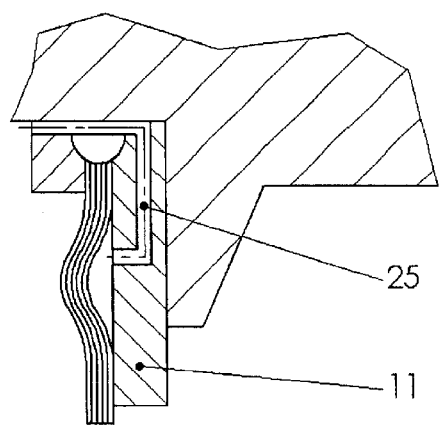
FIG 9
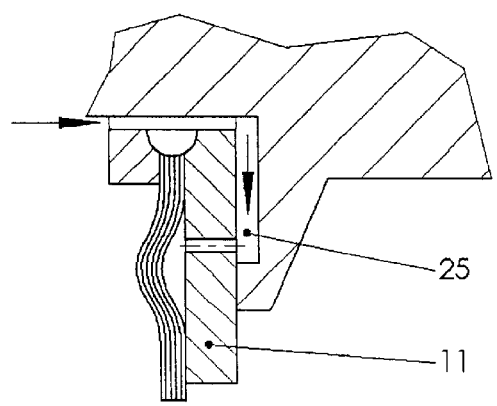
FIG 10

BRUSH SEAL ELEMENT

FIELD OF THE INVENTION

This invention relates to brush seal elements.

BACKGROUND OF THE INVENTION

In many circumstances where it is desired to form a seal between a high pressure region and a low pressure region in a fluid part extending between two generally coaxial elements, in which one is moving, usually rotationally, with respect to the other it is known to form a seal using a pack of bristles associated with a backing plate, which extends substantially across the gap between the elements to limit the pressure induced reflection of the bristles. Often the backing plate itself is insufficient to overcome the problems arising from bristle deflection and proposals were developed in the mid 1990s to enable local area of higher pressure to be induced between the bristles and the backing plate so as to reduce the pressure drop across the bristle pack and hence the tendency of the bristles to deflect. Such proposals are well described in U.S. Pat. No. 6,173,962. Here it will be seen that the bristles are essentially spaced from a backing plate, which is, at some portion, cranked, or otherwise formed so that it can engage against the lower edge of the bristles.

Whilst technically these approaches work quite well, they can be expensive to manufacture because of the specialised machinery needed to form shaped backing plates; because a range of shaped backing plates need to be produced for different sized seals and different pressure environments and because where fluid supplied to the cavity is passed through the bristles, but it can be expensive and more complicated to form an appropriate bristle array, which provides good sealing at the ends of the bristles, but allows flow into the cavity.

SUMMARY OF THE INVETION

From one aspect the invention consists in a brush seal element for sealing a region of high pressure from a region of low pressure, the element including an array of bristles and a backing member on the intended low pressure side of the seal the layer extending across a face of the backing member characterised in that the face is planar; the array is non-linear, when no pressure is applied, so that at least one portion of the array is spaced from the face to create a cavity there between and in that there is a fluid path for feeding pressurised fluid to the cavity to enable the pressure drop across the array to be reduced.

Various embodiments of this arrangement can be achieved. For example the non-linearity may extend substantially over the length of the array, so, for example, the layer may essentially be curved and additionally or alternatively the array may be held relative to the backing plates such that they diverge from the face when no pressure is applied.

In other embodiments the non-linearity may be localised along the length of the array and the non-linearity may be substantially triangular, square, rectangular or semi-circular in cross-section. Conveniently there may be a plurality of such non-linearities along the length of the array and there may be a variety of cross-sections.

It will be appreciated that creating cavities by forming different non-linearities into the bristle array is substantially cheaper than having to form ranges of backing plates and indeed this approach introduces substantial design freedom whereby, particularly where the brush elements are mounted side be side to form a seal, the performance of the seal can be adjusted along the length of the seal by forming different non-linearities in respective seal elements. A further significant advantage of this approach is that the formation of non-linearities increases the local porosity of the bristle array so that, in use, high pressure fluid can readily enter the cavity defined between the bristles and the plate and this is achieved without any loss of bristle density at the sealing edge of the element.

In some configurations, the cavity may not be closed, when no pressure is applied, because the pressure drop can be utilised to cause the bristle array to engage with the backing plate to define a boundary of the cavity.

As has been mentioned above the path for fluid may at least be in part through the bristle array and is most preferably located at or adjacent the non-linearity. Additionally or alternatively the path for pressurised fluid may at least in part be defined by a by-pass.

From a further aspect the invention consists in a brush seal element including bristles that are non-linear when the seal is not pressurised.

The invention also includes a seal assembly including a plurality of side-by-side elements as defined above.

Such an assembly may include seal elements having linear bristles to define end seals for a run of non-linear bristle seals.

Although the invention has been defined above, it is to be understood it includes any inventive combination of the features set out above or in the following description.

BRIEF DESCRIPTION OF THE DRAWINGS

The invention may be performed in various ways and specific embodiments will now be described, by way of example, with reference to the accompanying drawings, in which:

FIGS. 1 to 8 are scrap cross-sectional views through respective embodiments of brush seals of the invention;

FIGS. 9 and 10 are corresponding views including pressure bypass arrangements;

DETAILED DESCRIPTION

Figure 1:
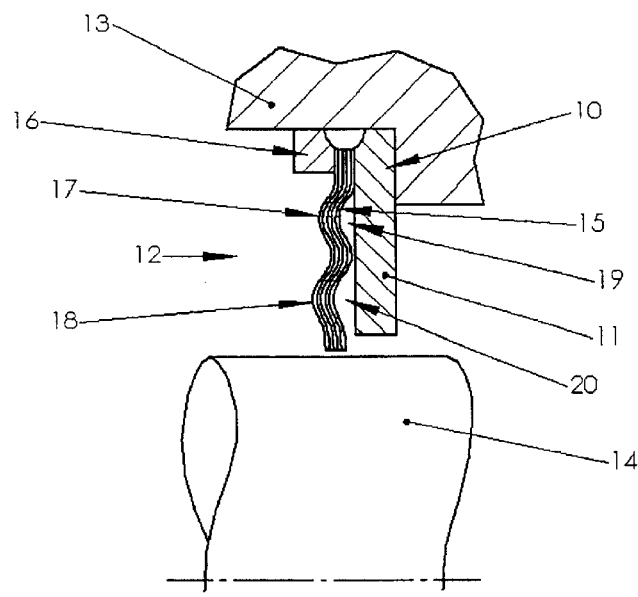

As can be seen in FIG. 1 the brush seal element, generally indicated at 10, has a backing plate 11 designed to project into a gap 12 between a fixed sleeve 13 and a shaft 14 and a bristle array 15 comprising a pack of bristle layers which is held in the sleeve 13 by a support 16.

It will be noted that the bristles 15 have non-linear portions 17, 18 which define cavities 19 and 20 between the array 15 and the plate 10. When high pressure occurs on the left hand side of the array 15 they are deflected against the plate 20, but the non-linearities 17 and 18 maintain the cavities. Indeed the pressure drop across the array is reduced because the array 15 is rendered porous by the formation of the indentations 17 and 18 so that high pressure fluid flows into the cavities 19 and 20. Preferably the cavities are of appropriate shape and sufficient dimension to achieve a substantial pressure balance or "zero" pressure drop across the array 15.

Figure 2:
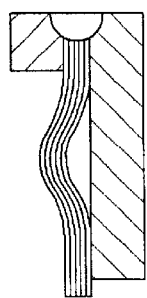
Figure 3:
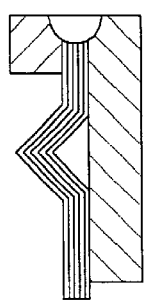
Figure 4:
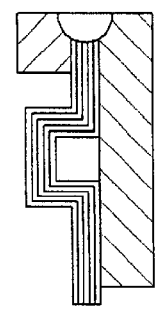

FIGS. 2 to 3 illustrate different forms of non-linearity that can be used to form different cavity shapes.

Figure 5:
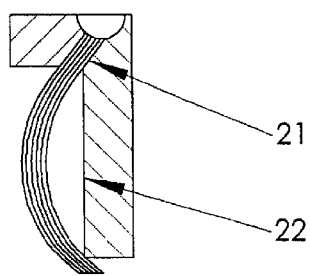
Figure 6:
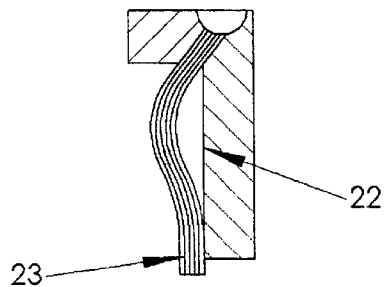

In FIGS. 5 and 6 the bristle array 15 is non-linear along at least a substantial part of its length and the backing plate 11 is chamfered at 21 so that the curve tends to take the layer initially away from the face 22 of the plate 11. In FIG. 5 there is a line engagement between the face 22 and the array 15, whereas in FIG. 6 the array curves back into a substantially linear portion 23.

In FIG. 7 the non-linearity is in the form of a crank and, in the unpressurised situation, the bristles substantially stand away from the face 22. However, when there is a pressure drop across the seal, the free end portion of the array 15 will be deflected back against the face 22 to form a boundary of the cavity.

FIG. 8 illustrates the use of a baffle plate 24 on the high pressure side of the array 15. This is designed to shield the array 15 from turbulence within the high pressure fluid. It will be understood that such a plate can be used in combination with any of the proposed designs.

FIGS. 9 and 10 illustrate how a cavity can be fed by a by-pass 25, which connects the high pressure side or other high pressure source to the cavity. In FIG. 9 the by-pass passes through the backing plate 11, whereas in FIG. 10 it runs behind that plate and then passes through an aperture therein. The second arrangement is simpler from the machining point of view.

Figure 11:
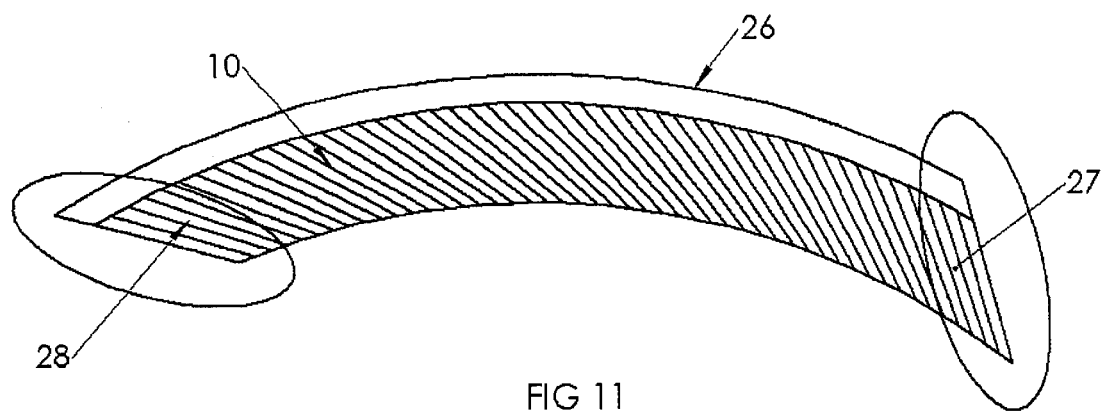
FIG. 11 is a schematic view of a seal assembly.

FIG. 11 demonstrates how a length of seal 26 can be made up of a number of the elements 10. In that case the end elements 27, 28 may have linear bristles so as to form effective end seals for the seal assembly 26.

Figure 12:
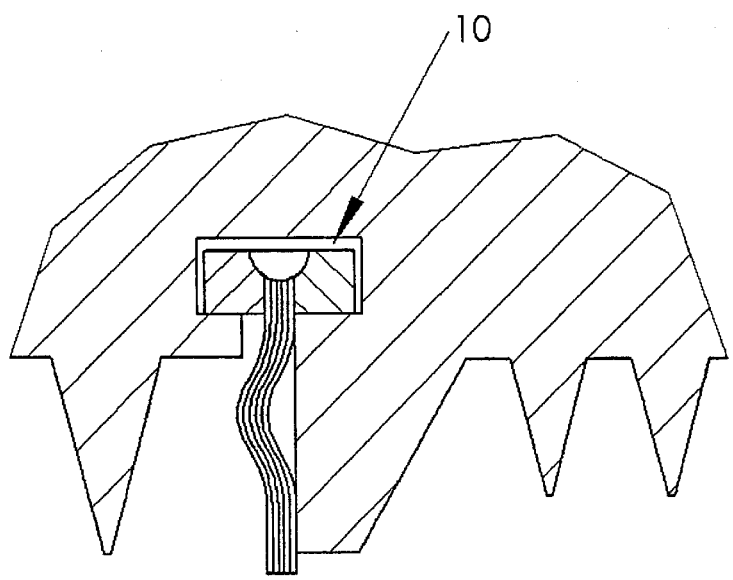
FIG. 12 is a schematic representation of an insert type version of the seal.

FIG. 12 illustrates how the concept can be adapted for an insert seal, for example as may be fitted into a larger part of a gas or steam turbine.

It will be understood that the cavity cross-section can be varied in accordance with design configurations and the rear of the backing plate could take any suitable shape.

What is claimed is:

1. A brush seal element for sealing a region of high pressure from a region of low pressure, the element including an array of bristles and a backing member on the intended low pressure side of the seal the array extending across a face of the backing member characterised in that the face is planar; the array is non-linear, when no pressure is applied, so that at least one portion of the array is spaced from the face to create a cavity there between and in that a fluid path for feeding pressurised fluid to the cavity to enable the pressure drop across the array to be reduced.

2. An element as claimed in claim 1 wherein the non-linearity extends substantially over the length of the array.

3. An element as claimed in claim 2 wherein the array is curved.

4. An element as claimed in claim 2 wherein the array is held relative to the backing plates such that it diverges from the face when no pressure is applied.

5. An element as claimed in claim 1 wherein the non-linearity is localised along the length of the array.

6. An element as claimed in claim 5 wherein the non-linearity is substantially triangular in section.

7. An element as claimed in claim 6 wherein the non-linearity is substantially square or rectangular in section.

8. An element as claimed in claim 6 wherein the non-linearity is substantially semi-circular in cross section.

9. An element as claimed in claim 5 wherein there is a plurality of non-linearities.

10. An element as claimed in claim 1 wherein the cavity is not closed when no pressure is applied.

11. An element as claimed in claim 1 wherein the path for fluid through the array is present in the non-linearity.

12. An element as claimed in claim 11 wherein the path for fluid through the array is present in the non-linearity.

13. An element as claimed in claim 1 wherein the path for pressurised fluid is at least in part defined by a bypass.

14. A turbo machine having a rotating shaft and including a brush seal element as claimed in claim 1.

15. A turbo machine as claimed in claim 14 being one of a gas turbine, a steam turbine, a rotary compressor or pump.

16. A seal assembly including a plurality of side-by-side elements as claimed in claim 1.

17. An assembly as claimed in claim 1 further including seal elements having a linear bristle array to define end seals for a run of non-linear bristle layer seals.

18. A turbo machine having a rotating shaft and including a seal assembly as claimed in claim 16.

* * * * *